(12) United States Patent
Saito et al.

(10) Patent No.: US 12,539,696 B2
(45) Date of Patent: Feb. 3, 2026

(54) LAMINATION PROCESSING SYSTEM

(71) Applicants: Yosuke Saito, Kanagawa (JP); Yuichiro Kato, Kanagawa (JP); Sho Asano, Kanagawa (JP); Ruki Midorikawa, Kanagawa (JP); Naoki Takai, Tokyo (JP); Kazuki Shimodate, Kanagawa (JP)

(72) Inventors: Yosuke Saito, Kanagawa (JP); Yuichiro Kato, Kanagawa (JP); Sho Asano, Kanagawa (JP); Ruki Midorikawa, Kanagawa (JP); Naoki Takai, Tokyo (JP); Kazuki Shimodate, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 18/534,229

(22) Filed: Dec. 8, 2023

(65) Prior Publication Data

US 2024/0239092 A1    Jul. 18, 2024

(30) Foreign Application Priority Data

Jan. 13, 2023   (JP) .................. 2023-003721

(51) Int. Cl.
*B32B 41/00* (2006.01)
*B32B 37/00* (2006.01)
(Continued)

(52) U.S. Cl.
CPC .......... *B32B 37/0053* (2013.01); *B32B 37/06* (2013.01); *B32B 37/18* (2013.01); *B32B 41/00* (2013.01); *B32B 43/006* (2013.01)

(58) Field of Classification Search
CPC .......... G03G 15/2039; G03G 15/6585; G03G 15/2064; B32B 37/142; B32B 37/182;
(Continued)

(56) References Cited

U.S. PATENT DOCUMENTS

2020/0247636 A1    8/2020  Furuhashi et al.
2021/0405571 A1*  12/2021  Nozaki .............. G03G 15/6588
(Continued)

FOREIGN PATENT DOCUMENTS

JP    2001-328168 A    11/2001
JP    2020-121868 A     8/2020

OTHER PUBLICATIONS

U.S. Appl. No. 18/206,624, filed Jun. 7, 2023.
U.S. Appl. No. 18/210,095, filed Jun. 15, 2023.
U.S. Appl. No. 18/211,612, filed Jun. 20, 2023.

*Primary Examiner* — Michael N Orlando
*Assistant Examiner* — Joshel Rivera
(74) *Attorney, Agent, or Firm* — Harness, Dickey & Pierce, P.L.C.

(57) ABSTRACT

A lamination processing system includes a sheet separation device, a lamination fixing device, and a conveyor. The sheet separation device separates a two-ply sheet to insert a sheet medium between two sheets of the two-ply sheet to form an enclosed two-ply sheet. The lamination fixing device includes an inlet port and a heater. The conveyor conveys the enclosed two-ply sheet from the sheet separation device to the lamination fixing device in a conveyance direction. The conveyor includes a conveyance passage and a guide. The conveyance passage guides the enclosed two-ply sheet from the sheet separation device toward the lamination fixing device. The guide guides the enclosed two-ply sheet to the inlet port. The guide forms a space accommodatable a deflected part of the enclosed two-ply sheet formed by a difference in a conveyance speed of the enclosed two-ply sheet between the sheet separation device and the lamination fixing device.

15 Claims, 11 Drawing Sheets

(51) Int. Cl.
*B32B 37/06* (2006.01)
*B32B 37/18* (2006.01)
*B32B 43/00* (2006.01)

(58) Field of Classification Search
CPC ............ B32B 2037/0061; B32B 41/00; B32B 37/0053
USPC .................... 156/60, 64, 350, 351, 378, 379
See application file for complete search history.

(56) References Cited

U.S. PATENT DOCUMENTS

| | | |
|---|---|---|
| 2022/0334523 A1 | 10/2022 | Akiyama et al. |
| 2023/0202159 A1 | 6/2023 | Monma et al. |
| 2023/0202780 A1 | 6/2023 | Takahashi et al. |
| 2023/0202790 A1 | 6/2023 | Asano et al. |
| 2023/0221672 A1 | 7/2023 | Sugiyama et al. |
| 2024/0253341 A1* | 8/2024 | Shimodate .............. B32B 41/00 |

* cited by examiner

LAMINATION PROCESSING SYSTEM

CROSS-REFERENCE TO RELATED APPLICATION

This patent application is based on and claims priority pursuant to 35 U.S.C. § 119(a) to Japanese Patent Application No. 2023-003721, filed on Jan. 13, 2023, in the Japan Patent Office, the entire disclosure of which is hereby incorporated by reference herein.

BACKGROUND

Technical Field

Embodiments of the present disclosure relate to a lamination processing system.

Background Art

Lamination technologies are known in the art that insert an inner sheet (e.g., paper or photo) between a two-ply lamination sheet or lamination film (e.g., a lamination pouch or lamination folder) and apply heat and pressure to the two-ply lamination sheet to bond the two-ply lamination sheet. The two-ply lamination sheet is made of two sheets (plies) bonded (sealed) on one side as if one sheet is folded.

This sheet laminating operation is a manual, cumbersome operation in which the two sheets of a two-ply sheet are separated, a sheet such as an inner sheet is inserted to the correct position between the two sheets of the two-ply sheet, then a fixing operation is performed with a sheet laminator.

In contrast, a sheet separation device in the art winds a two-ply sheet around a rotary member to have a winding circumferential length difference between the sheet on the inner circumference and the sheet on the outer circumference, so that the two sheets of the two-ply sheet are separated. Further, a sheet laminator in the art has the sheet separation device and a thermal pressure member (i.e., a sheet lamination fixing device) that heats and presses the two-ply sheet.

SUMMARY

Embodiments of the present disclosure described herein provide a novel lamination processing system including a sheet separation device, a lamination fixing device, and a conveyor. The sheet separation device is in a first housing, to separate a two-ply sheet in which two sheets are overlapped and bonded together at one ends to insert a sheet medium between the two sheets of the two-ply sheet to form an enclosed two-ply sheet. The lamination fixing device is in a second housing different from the first housing. The lamination fixing device includes an inlet port and a heater. The inlet port is a port from which the enclosed two-ply sheet enters. The heater applies heat and pressure to the enclosed two-ply sheet to fix the enclosed two-ply sheet. The conveyor conveys the enclosed two-ply sheet from the sheet separation device in the first housing to the lamination fixing device in the second housing in a conveyance direction. The conveyor includes a conveyance passage and a guide. The conveyance passage guides the enclosed two-ply sheet from the sheet separation device toward the inlet port of the lamination fixing device. The guide is downstream from the conveyance passage in the sheet conveyance direction to guide the enclosed two-ply sheet to the inlet port. The guide forms a space accommodatable a deflected part of the enclosed two-ply sheet formed by a difference in a conveyance speed of the enclosed two-ply sheet between the sheet separation device and the lamination fixing device.

BRIEF DESCRIPTION OF THE SEVERAL VIEWS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
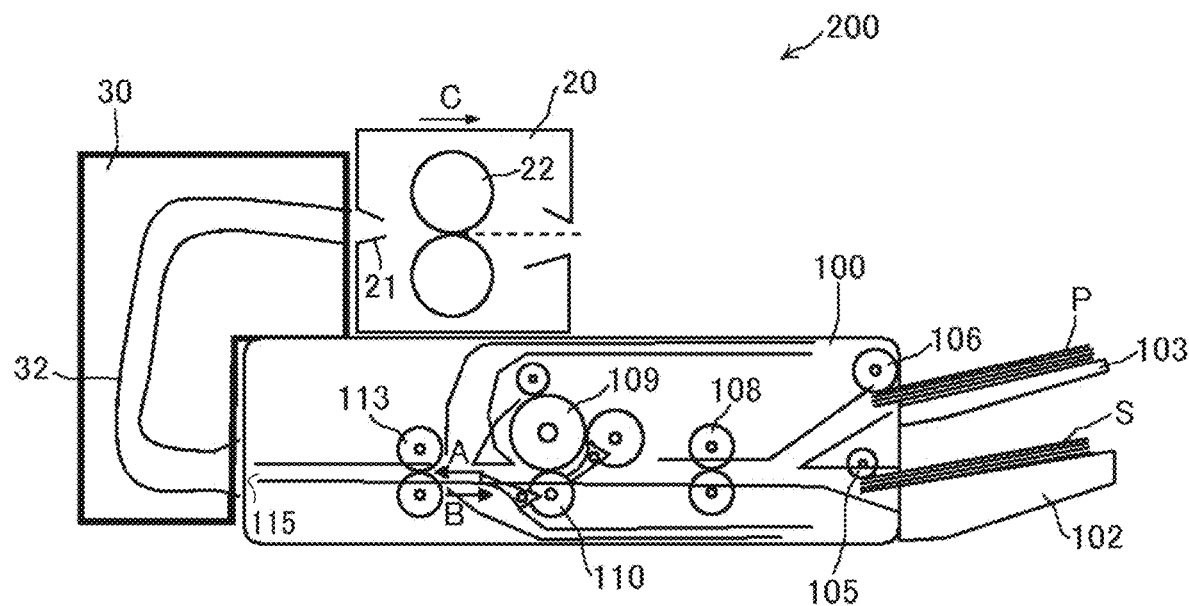
FIG. 1 is a diagram illustrating an overall configuration of a lamination processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

It will be understood that if an element or layer is referred to as being "on," "against," "connected to" or "coupled to"

another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. As used herein, the singular forms "a," "an," and "the" are intended to include the plural forms as well, unless the context clearly indicates otherwise.

Before describing embodiments of the present disclosure, preliminary matters for facilitating understanding of the embodiments will be described below.

A typical lamination processing apparatus includes a thermal pressure member (for example, a fixing device) horizontally disposed downstream from a sheet separation device in a sheet conveyance direction. Due to the arrangement, the typical lamination processing apparatus has a relatively large lateral width (footprint).

To address this inconvenience, the inventors have conceived of a configuration including a sheet conveyance passage in which a two-ply sheet between the laminator and the sheet by reducing the occupied area of the lamination processing apparatus and placing a known laminator (for example, a lamination fixing device) on the sheet separation device to effectively use the laminator.

In this configuration, a known laminator is employed to automatically perform a series of laminating processes at low cost.

Such known laminators are manufactured and sold as lamination apparatuses by various manufacturers. Such lamination apparatuses have various sizes and lamination processing capabilities (such as the conveyance speeds). For this reason, even when a sheet separation device and a laminator are coupled to each other if the respective conveyance speeds are different, wrinkles or skew (diagonal conveyance) are generated in a lamination sheet. Accordingly, it is unlikely that the thermal fixing is appropriately performed.

In this case, another laminator may be employed or the sheet conveyance passage may be adjusted (redesigned) in accordance with the specification of the laminator, which impairs the convenience.

In the following embodiments, a description is given of a lamination processing system that can prevent occurrence of the wrinkles or skew of a two-ply sheet enclosing a sheet medium by absorbing the difference in the conveyance speed between the sheet separation device and the lamination fixing device.

First Embodiment

A description is given of a lamination processing system according to an embodiment of the present disclosure, with reference to FIG. 1.

FIG. 1 is a schematic diagram illustrating an overall configuration of a lamination processing system according to an embodiment of the present disclosure.

The lamination processing system 200 performs a series of operations of feeding a lamination sheet (i.e., a sheet S), separating two sheets of the lamination sheet S, inserting an inner sheet P into the lamination sheet S, and laminating the lamination sheet S enclosing the inner sheet P, by application of heat and pressure, on a stand-alone basis. This series of operations is carried out automatically without any aid of a user. For this reason, the lamination processing system 200 can enhance and provide the convenience better than a known sheet laminator employing a known technique.

The lamination sheet S is a two-ply sheet in which two sheets are overlapped and bonded together at a portion (or a side) of the two-ply sheet. For example, a two-ply sheet has two sheets (two sides). A first side of the two-ply sheet serves as a transparent sheet such as a transparent polyester sheet, a second side of the two-ply sheet serves as a transparent or opaque sheet disposed facing the first side, and the first and second sides are bonded at one side of the two-ply sheet. The two-ply sheet also includes a lamination film.

The inner sheet P serves as a sheet medium to be inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 1, the lamination processing system 200 includes a sheet separation device 100 and a lamination fixing device 20. The sheet separation device 100 separates two sheets of the sheet S (the two-ply sheet) and inserts the inner sheet P between the two sheets of the sheet S. The lamination fixing device 20 is a separate unit from the sheet separation device 100 and heats and presses the sheet S enclosing the inner sheet P. The sheet S enclosing the inner sheet P is also referred to as a sheet Sp. The lamination processing system 200 further includes a conveyor 30 to convey the sheet Sp from the sheet separation device 100 to the lamination fixing device 20.

In the lamination processing system 200 according to the present embodiment, the lamination fixing device 20 is disposed above the sheet separation device 100. The conveyor 30 is disposed downstream from the sheet separation device 100 in a sheet conveyance direction and has a conveyance passage 32 through which the sheet Sp is inverted by 180 degrees and is conveyed to the lamination fixing device 20. A sheet conveyance direction C in the lamination fixing device 20 is a direction opposite to a sheet conveyance direction A in the sheet separation device 100.

A description is given of a series of operations of feeding the sheet S, separating two sheets of the sheet S, inserting the inner sheet P into the sheet S, and laminating the sheet S enclosing the inner sheet P by application of heat and pressure, performed by the lamination processing system 200 according to the present embodiment.

The lamination processing system 200 according to the present embodiment employs a typical technique of separating a sheet S, to be more specific, a technique in which a two-ply sheet (sheet S) is wound around a rotary member to have a winding circumferential length difference between the sheet on the inner circumference and the sheet on the outer circumference in a geometrical relation, so that the two sheets of the two-ply sheet are separated. A description is now given of a basic configuration and functions of the lamination processing system 200 according to an embodiment of the present disclosure.

Sheet Separation Device

The sheet separation device 100 includes a sheet tray 102, a pickup roller 105, and an entrance roller pair 108. The sheet tray 102 stacks sheets S. The pickup roller 105 feeds a sheet S from the sheet tray 102. The sheet separation device 100 further includes a sheet tray 103 and a pickup roller 106. The sheet tray 103 stacks inner sheets P. The pickup roller 106 feeds an inner sheet P from the sheet tray 103.

The sheet separation device 100 further includes an entrance roller pair 108, a roller pair including a winding roller 109 and a driven roller 110, and an exit roller pair 113. The entrance roller pair 108 is disposed downstream from the pickup roller 105 and the pickup roller 106 in the sheet conveyance direction. The winding roller 109 serves as a rotary member.

As illustrated in FIG. 1, the sheet separation device 100 according to the present embodiment loads the sheet S and the inner sheet P on separate trays. In the present embodiment, the sheets S are stacked on the sheet tray 102 such that the bonded side is on the downstream side in the direction of feeding the sheet S (the sheet conveyance direction) of the pickup roller 105.

In the sheet separation device 100, the pickup roller 105 picks up a sheet S, the roller pair including the winding roller 109 and the driven roller 110 conveys the sheet S in a direction indicated by arrow A, so as to send the sheet S to the exit roller pair 113.

Then, the exit roller pair 113 and the winding roller 109 reverse the rotational directions to convey the sheet S in a direction indicated by arrow B. The sheet S conveyed in the direction indicated by arrow DB is wound around the winding roller 109. As the sheet S is wound around the winding roller 109 for more than one round, the leading end of the sheet S in the sheet conveyance direction (i.e., the side where the two sheets of the sheet S are overlapped but not bonded) is fixed to the winding roller 109.

When the sheet S is further wound around the winding roller 109, a winding circumferential length difference is created between the two sheets of the sheet S, to be more specific, the sheet on the inner circumference and the sheet on the outer circumference of the sheet S (i.e., a difference between the two sheets in the amount of winding of the sheet S around circumference of the winding roller 109). Due to the difference, the two sheets of the sheet S start separation from each other between the exit roller pair 113 and the winding roller 109.

Then, the deflection of the sheet on the inner circumference side is collected between the exit roller pair 113 and the winding roller 109, which can create a gap (space) between the sheet on the inner circumference side and the sheet on the outer circumference side.

Then, the sheet separation device 100 causes separation members to be inserted into the gap created in the sheet S from both lateral sides of the sheet S. As the sheet S is continuously conveyed, the sheet S widely opens.

The sheet separation device 100 then rotates the entrance roller pair 108 to convey an inner sheet P conveyed from the sheet tray 102 toward the exit roller pair 113 in the sheet conveyance direction A.

The inner sheet P is inserted between the two sheets of the sheet S so that the inner sheet P contacts the bonded portion of the sheet S. The sheet separation device 100 then rotates the exit roller pair 113 in the clockwise direction to cause the sheet S and the inner sheet P to meet to enclose the inner sheet P in the sheet S that is open.

The sheet S (sheet Sp) enclosing the inner sheet P is conveyed through an exit port 115 of the sheet separation device 100 to the lamination fixing device 20 via the conveyance passage 32 in the conveyor 30.

The sheet separation device 100 performs the series of operations (the operations from separation of a sheet S to insertion of an inner sheet P into the sheet S) employed by typical sheet separation devices.

Lamination Fixing Device

The lamination fixing device 20 includes a sheet insertion port 21 and a thermal pressure roller pair 22. The sheet insertion port 21 is an inlet port of a sheet to be laminated, in other words, a sheet to be thermally fixed. The thermal pressure roller pair 22 includes a heater. The thermal pressure roller pair 22 heats and presses the sheet Sp to fix the lamination on the sheet Sp.

If the two-ply sheet is a laminated film, when the adhesive (made of EVA) applied to the inner side of the film reaches the melting point, the adhesive melts and the two sheets of the two-ply sheet are bonded to each other. Thus, the sheet Sp after the sheet laminating operation is ejected via an ejection roller from the lamination fixing device 20.

The lamination fixing device 20 is a separate unit different from the sheet separation device 100. The lamination fixing device 20 maybe a lamination device commercially available (a typical lamination device on the market). Further, various lamination devices are on the market from various manufacturers and have different sizes, different lamination (fixing) processing speeds, or both. Such lamination devices typically employ a processing speed of, for example, one to three sheets per minute.

Conveyor

Figure 2:
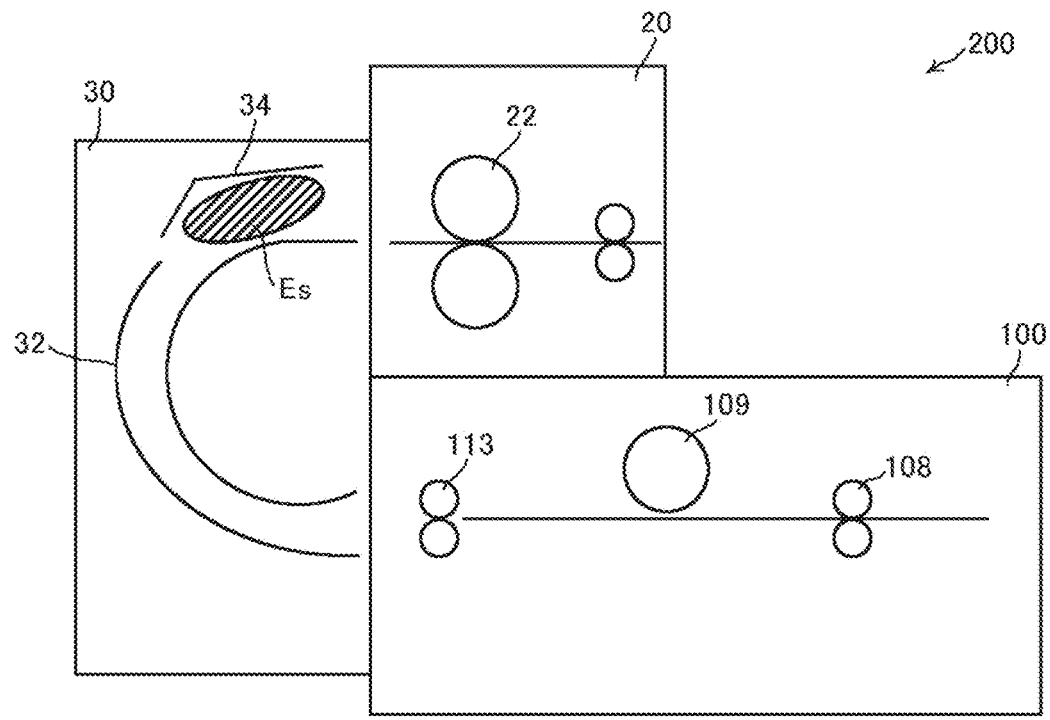
FIG. 2 is a diagram illustrating a configuration of a conveyor included in the lamination processing system of FIG. 1.

FIG. 2 is a diagram illustrating a configuration of the conveyor 30 included in the lamination processing system 200 of FIG. 1.

In FIG. 2, the same components as those in FIG. 1 are denoted by the same reference numerals, and the detailed description of the configuration will be omitted.

The conveyor 30 includes the conveyance passage 32 and a guide 34. The conveyance passage 32 guides the sheet Sp conveyed from the sheet separation device 100 to the entrance of the lamination fixing device 20. The guide 34 is detachably disposed from a downstream portion of the conveyance passage 32 in the sheet conveyance direction to the entrance of the lamination fixing device 20.

The guide 34 forms a space Es for keeping the deflection of the sheet Sp caused by the difference in conveyance speed between the sheet separation device 100 and the lamination fixing device 20.

Figure 3:
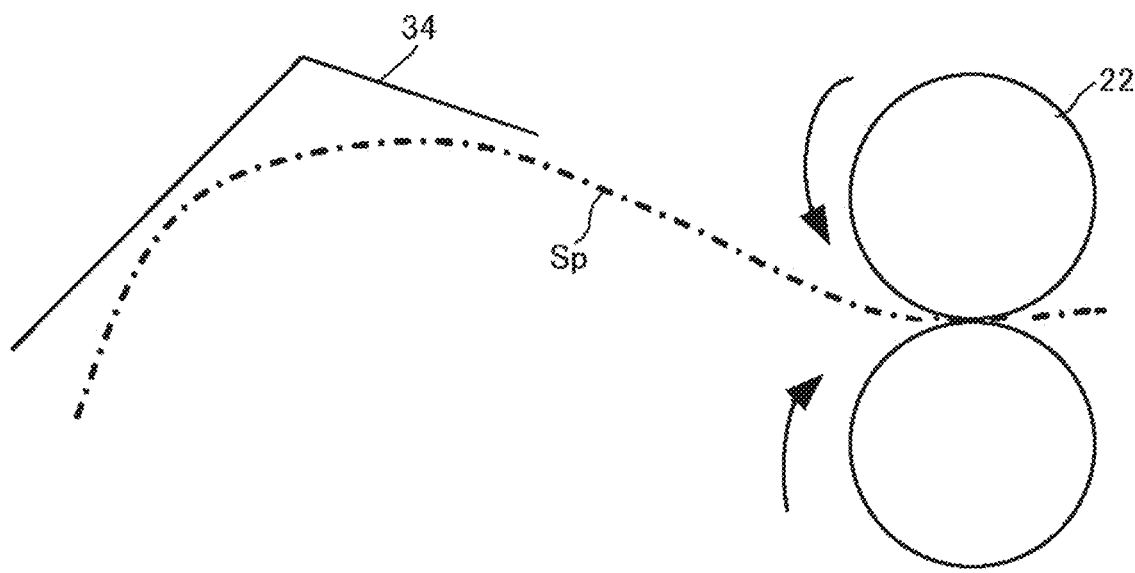
FIG. 3 is a schematic view of the conveyor of FIG. 2, when a sheet is being conveyed in the conveyor according to the present embodiment.

FIG. 3 is a schematic view of the conveyor of FIG. 2, when a sheet is being conveyed in the conveyor according to the present embodiment.

As illustrated in FIG. 3, the sheet Sp conveyed from the sheet separation device 100 to the lamination fixing device 20 is deflected to some extent. However, the sheet Sp is guided to the guide 34 to contact the nip region of the thermal pressure roller pair 22.

For example, when the sheet separation device 100 has the conveyance speed of the sheet Sp slower than the conveyance speed of the lamination fixing device 20, wrinkles, skew, or both occur in the sheet Sp. Accordingly, it is not likely that the sheet Sp contacts the nip region of the thermal pressure roller pair 22.

Figure 4:
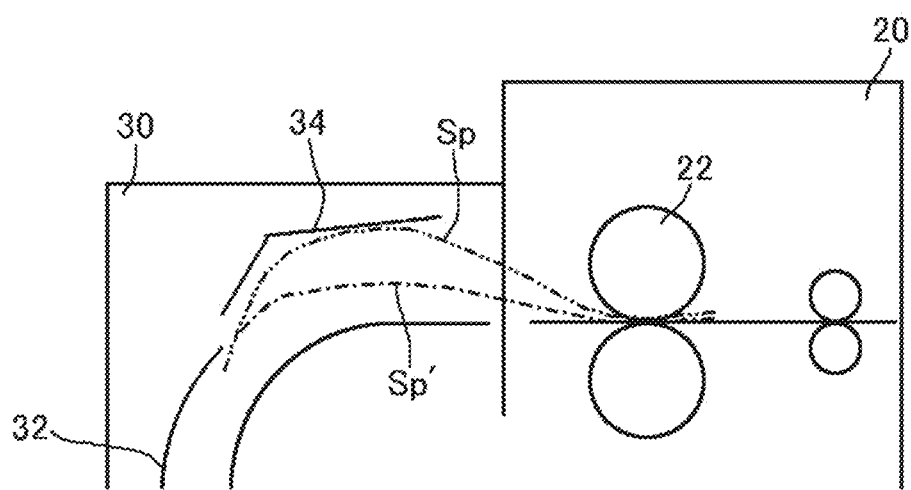
FIG. 4 is another schematic view of the conveyor of FIG. 2, when a sheet is being conveyed in the conveyor according to the present embodiment.

FIG. 4 is another schematic view of the conveyor of FIG. 2, when a sheet is being conveyed in the conveyor according to the present embodiment.

In contrast, in the present embodiment, as illustrated in FIG. 4, the sheet Sp can be deflected (the sheet Sp is allowed to have deflection) due to the space Es formed by the guide 34, and can contact the nip region of the thermal pressure roller pair 22.

On the other hand, when the difference in conveyance speed of a sheet Sp' is relatively small between the sheet separation device 100 and the lamination fixing device 20, the bend of the sheet Sp' is smaller (the amount of deflection of a sheet Sp>the amount of deflection of a sheet Sp'). In this case, however, the sheet Sp' can contact the nip region of the thermal pressure roller pair 22 smoothly.

As described above, in the present embodiment, the guide 34 absorbs the difference in conveyance speed of the sheet Sp between the sheet separation device 100 and the lamination fixing device 20, which can prevent occurrence of the wrinkles or skew of the sheet Sp. Further, as illustrated in FIG. 4, even if the deflection of the sheet Sp varies to some extent, the sheet Sp can be stably conveyed to the thermal pressure roller pair 22.

A configuration in which "deflection" of a recording medium is used in conveyance of the recording medium is employed in typical sheet separation devices. Specifically, in a laminating apparatus including a printer that performs printing by an ink jet method while intermittently conveying a recording medium and a laminator that performs a laminating process on a printed portion by heating, the recording medium has deflection when the recording medium is conveyed to the laminator.

The above-described configuration is similar to the present disclosure in that the recording medium is formed with deflection. However, the typical sheet separation device has the configuration to terminate the sheet feeding operation of a recording medium when the recording medium is conveyed to the laminator after printing and does not have a configuration to absorb the difference in conveyance speed of a sheet between the sheet separation device and the lamination fixing device.

As described above, the lamination processing system can use a separate unit (known) lamination fixing device (laminator).

A description is given below of an advantageous configuration of the lamination processing system 200.

An attachment type guide 34 having a shape different per the difference in conveyance speed of a sheet may be prepared to replace the guide 34 in accordance with the difference in the conveyance speed of a sheet. By replacing the guide 34, the lamination fixing device 20 can cope with various conveyance speeds of a sheet in the lamination fixing device 20 (i.e., a commercially-available (known) laminator).

Figure 5:
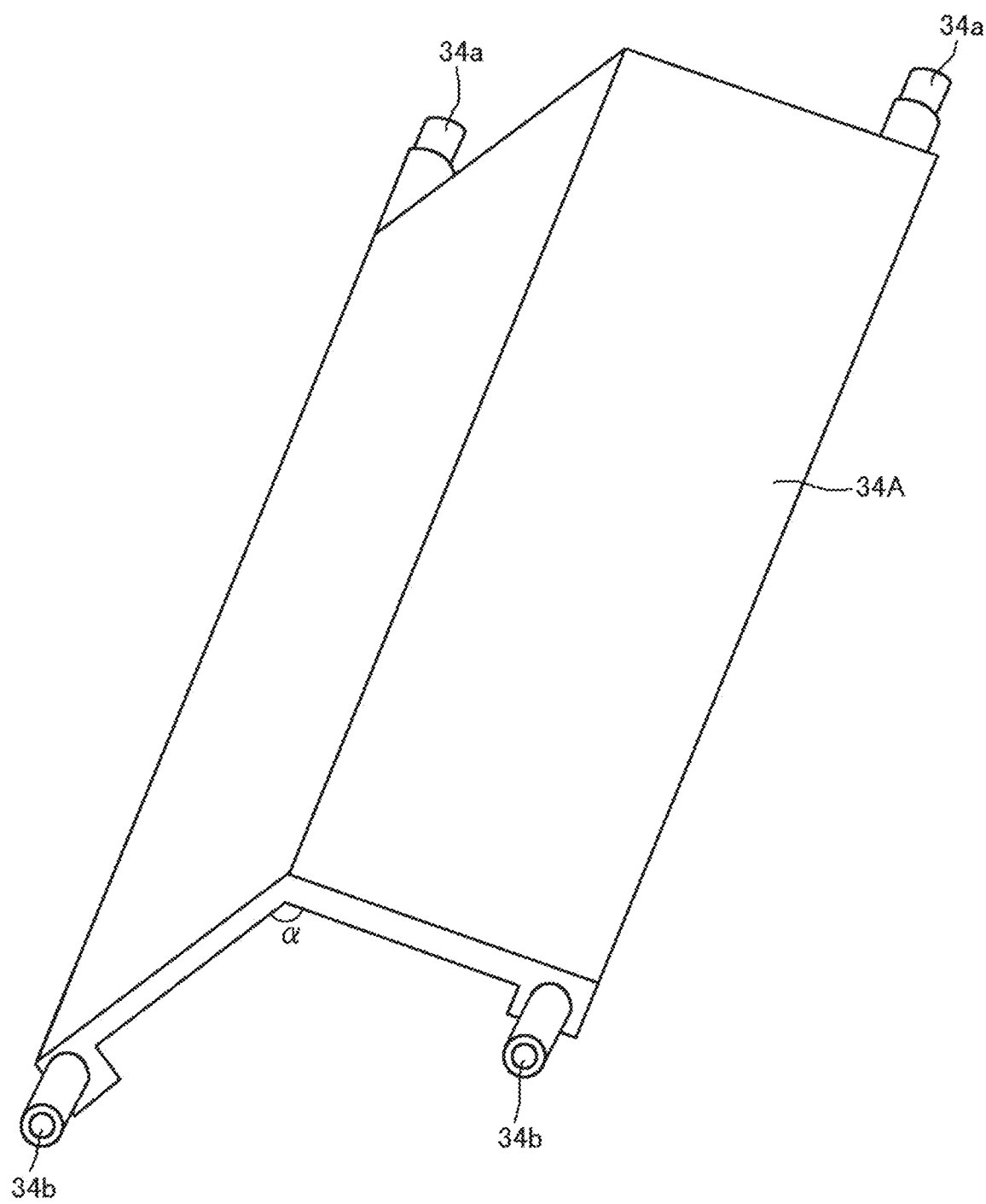
FIG. 5 is a diagram illustrating a configuration of a guide according to the present embodiment.

FIG. 5 is a diagram illustrating a configuration of a guide according to the present embodiment.

A guide 34A is formed by bending a plane panel at a given angle α. The guide 34A has projections 34a for positioning at one end and screw holes 34b for fixing at the opposite end. The projections 34a and the screw holes 34b can be used to attach the guide 34A to the housing of the conveyor 30 to the housing (see FIG. 2).

Figure 6A:
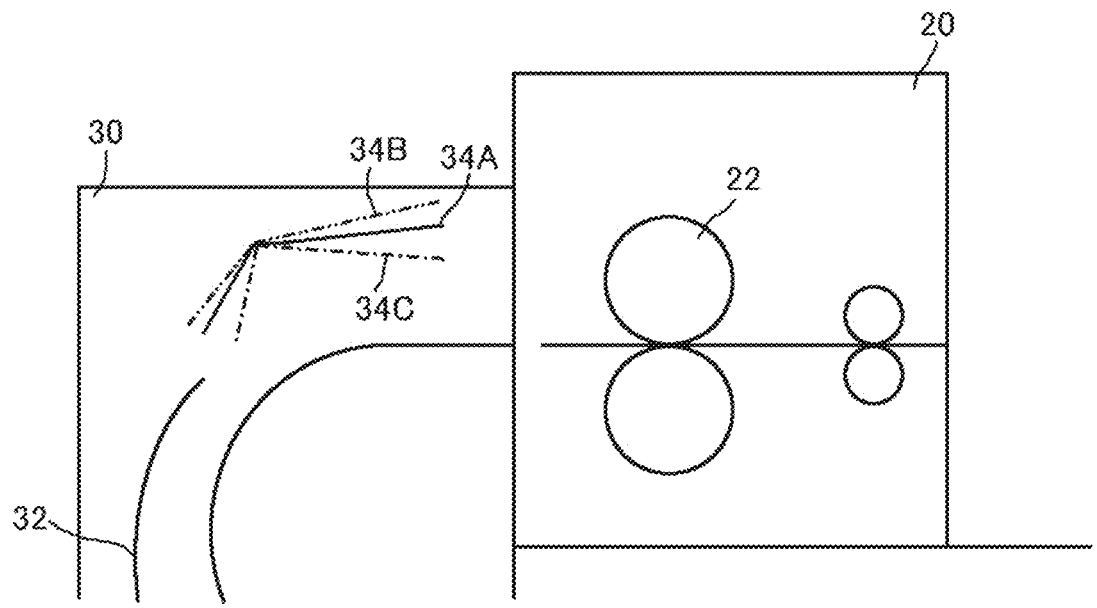
FIG. 6A is a diagram illustrating the lamination processing system according to a modification of the above-described embodiments, the lamination processing system having the guide with different deflection angles.

FIG. 6A is a diagram illustrating the lamination processing system 200 according to a modification of the above-described embodiments, the lamination processing system 200 having the guide with different deflection angles.

Figure 6B:
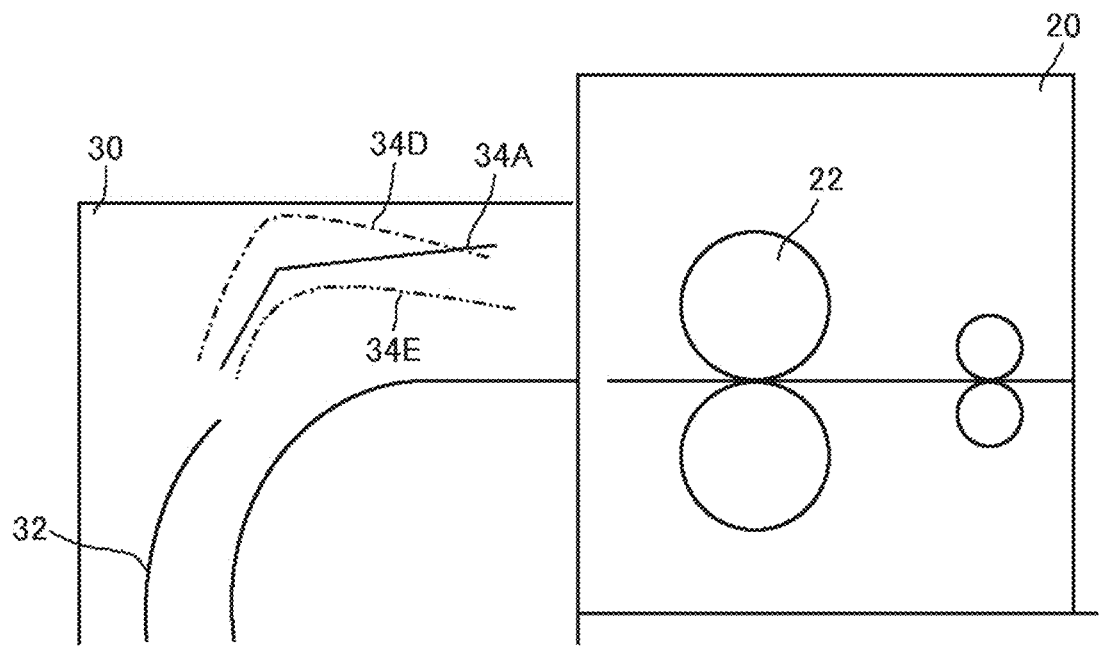
FIG. 6B is a diagram illustrating the lamination processing system according to a modification of the above-described embodiments, the lamination processing system having the guide with a curved portion.

FIG. 6B is a diagram illustrating the lamination processing system 200 according to a modification of the above-described embodiments, the lamination processing system 200 having the guide with a curved portion.

The guide can have a shape such as guides 34B and 34C with a changed deflection angle α as illustrated in FIG. 6A or guides 34D and 34E with a curved shape as illustrated in FIG. 6B.

Figure 7A:
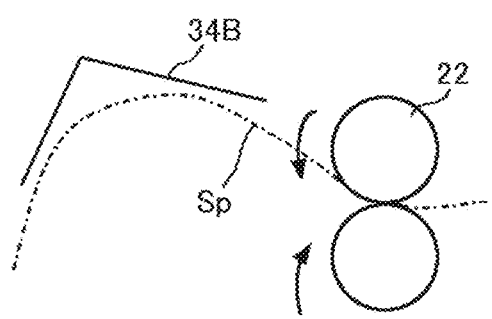
FIG. 7A is a diagram illustrating the conveyor with the guide of FIG. 6A or 6B, when a sheet is being conveyed in the conveyor according to the present embodiment.

FIG. 7A is a diagram illustrating the conveyor 30 with the guide of FIG. 6A or 6B, when a sheet is being conveyed in the conveyor 30 according to the present embodiment.

Figure 7B:
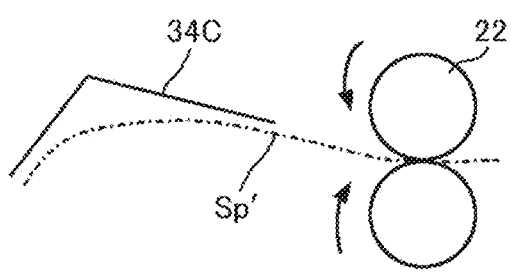
FIG. 7B is a diagram illustrating the conveyor with the guide of FIG. 6A or 6B, when a sheet is being conveyed in the conveyor according to the present embodiment.

FIG. 7B is a diagram illustrating the conveyor 30 with the guide of FIG. 6A or 6B, when a sheet is being conveyed in the conveyor 30 according to the present embodiment.

The guide 34B or the guide 34D can increase a space for keeping the deflection of the sheet Sp. When the lamination fixing device 20 has the conveyance speed of the sheet Sp is slower than the conveyance speed of the sheet separation device 100, the deflection created in the sheet Sp increases. However, as illustrated in FIG. 7A, the sheet Sp can be guided along the guide 34B (or the guide 34D) to the nip region of the thermal pressure roller pair 22.

On the other hand, the guide 34C or the guide 34E can reduce the space for keeping the deflection of the sheet Sp. When the difference in the conveyance speed of the sheet Sp between the lamination fixing device 20 and the sheet separation device 100 is relatively small, the deflection created in the sheet Sp' decreases. However, as illustrated in FIG. 7B, the sheet Sp can be guided along the guide 34C (or the guide 34E) to the nip region of the thermal pressure roller pair 22.

Second Embodiment

Figure 8:
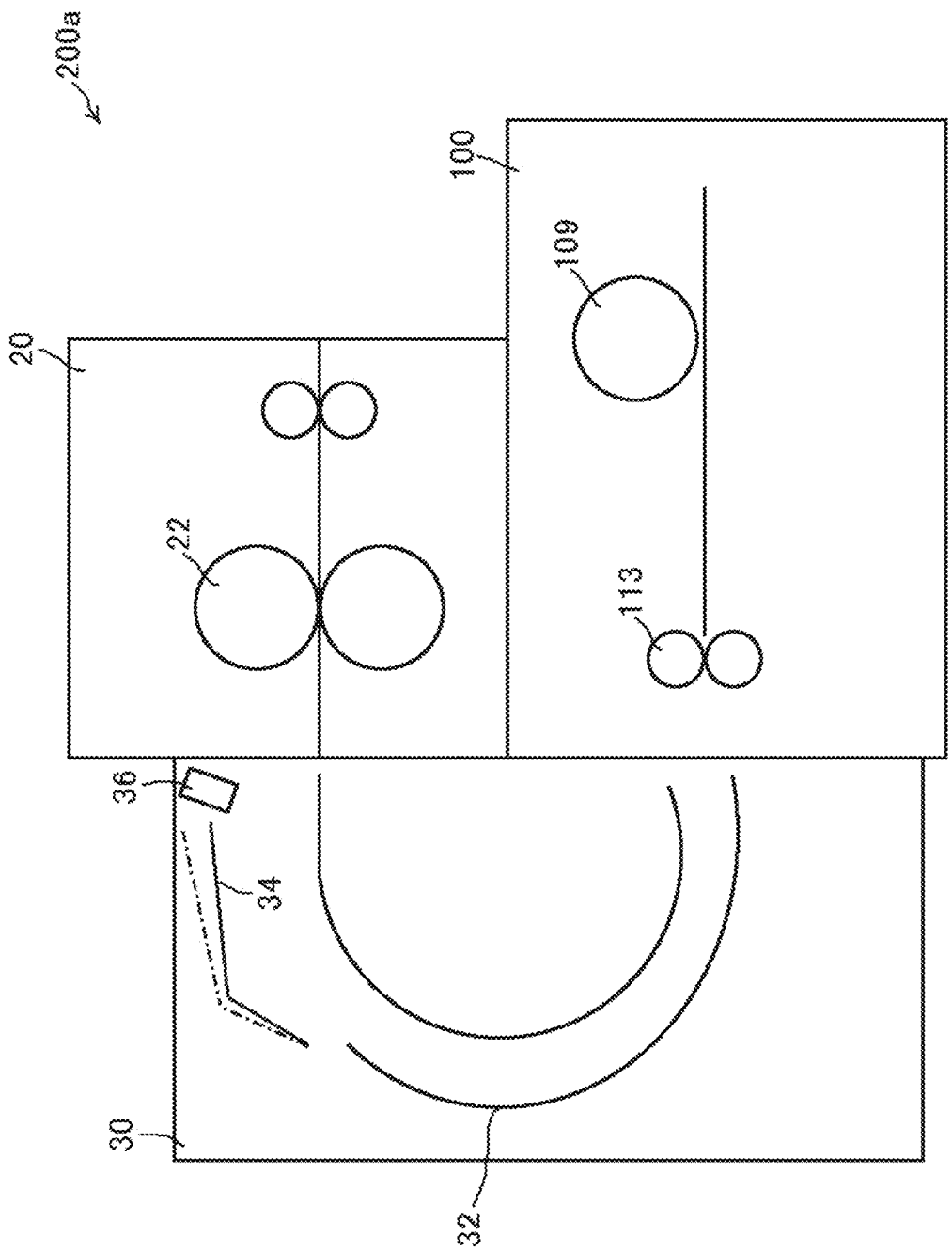
FIG. 8 is a diagram illustrating a partial configuration of the lamination processing system according to a second embodiment of the present invention.

A description is given of a lamination processing system according to a second embodiment of the present disclosure, with reference to FIG. 8.

FIG. 8 is a schematic diagram illustrating a partial configuration of a lamination processing system according to the second embodiment of the present disclosure.

In FIG. 8, the same components as those in FIG. 2 are denoted by the same reference numerals, and the detailed description of the configuration will be omitted.

The conveyor 30 in the lamination processing system 200a includes a deflection sensor 36 that detects the amount of deflection occurs in a sheet Sp. With this configuration, the lamination processing system 200a moves the guide 34 based on the detected amount of deflection to form a space for keeping the deflection of the sheet Sp. The deflection sensor 36 serves as a deflection detector.

Figure 9:
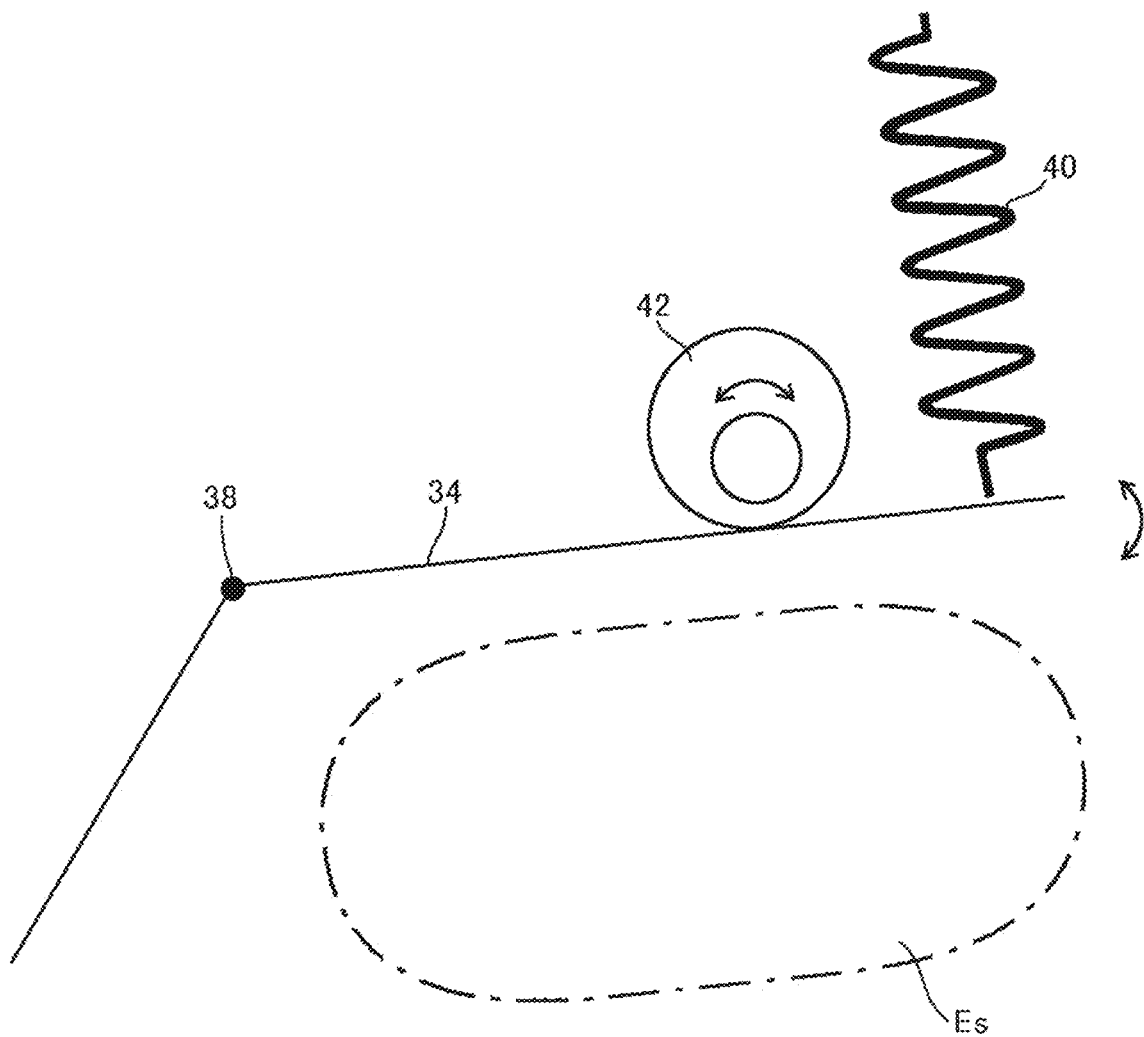
FIG. 9 is a diagram illustrating a configuration of a moving mechanism of the guide, according to the second embodiment.

FIG. 9 is a diagram illustrating a configuration of a moving mechanism of the guide, according to the second embodiment.

The guide 34 is disposed to be rotatable around a rotary shaft 38 and is biased in the counterclockwise direction by a spring 40. On the other hand, the guide 34 is biased in the clockwise direction by an eccentric cam 42. As described above, rotating the eccentric cam 42 can form the space Es for keeping the deflection of the sheet Sp to have a desired size.

As described above, the lamination processing system 200a according to the second embodiment moves the guide 34 in accordance with the detected amount of deflection, and thus the space Es for keeping the deflection can be formed appropriately.

Advantageously, the lamination processing system 200a can adjust the conveyance speed of the sheet Sp from the sheet separation device 100 to the lamination fixing device 20 in accordance with the detected amount of deflection. This is also effective in a case where the detected amount of deflection is relatively large and the space Es for keeping the deflection of the sheet Sp cannot be formed, or in a case where a configuration that allows the guide 34 to move is not (or cannot be) disposed.

Figure 10:
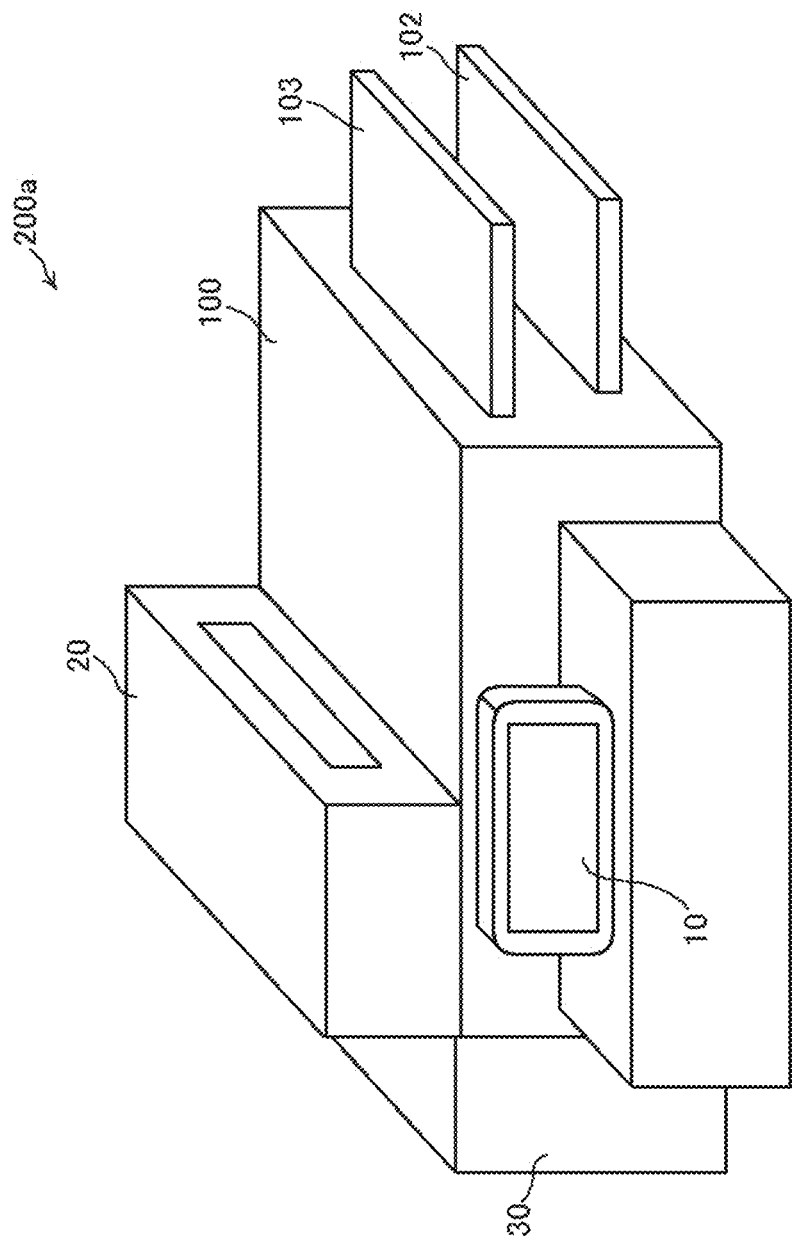
FIG. 10 is an overall external view of a lamination processing system according to the second embodiment of the present disclosure.

A description is given of a lamination processing system according to the second embodiment of the present disclosure, with reference to FIG. 10.

FIG. 10 is an overall external view of a lamination processing system according to the second embodiment of the present disclosure.

In FIG. 10, the same components as those in FIG. 1 are denoted by the same reference numerals, and the detailed description of the configuration will be omitted.

The lamination processing system 200a includes a display panel 10 (in other words, an operation control panel) on one side of the exterior. The display panel 10 serves as an instruction input unit on which information of the system is displayed and to which instructions for the system are input. The display panel 10 serves as a display unit that displays information for a user or users.

Figure 11:
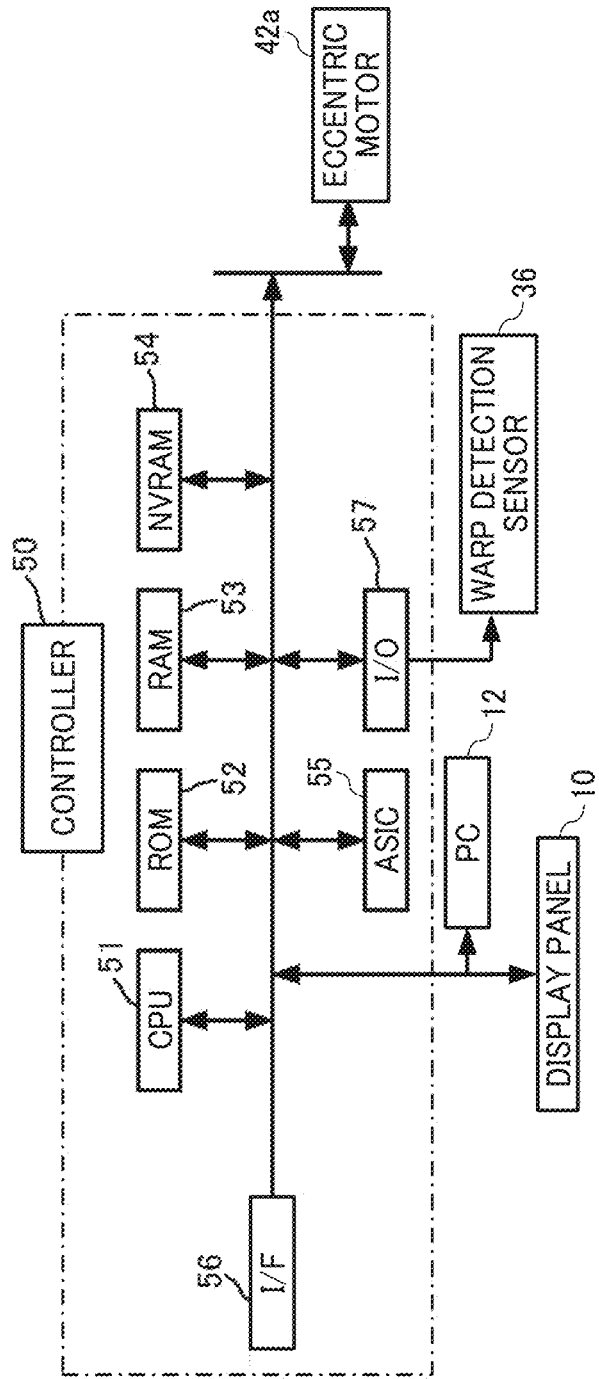
FIG. 11 is a block diagram illustrating the lamination processing system according to the second embodiment of the present disclosure.

FIG. 11 is a block diagram illustrating the lamination processing system 200a according to the second embodiment of the present disclosure.

The lamination processing system 200a includes a controller 50 including a central processing unit (CPU) 51, a read-only memory (ROM) 52, a random-access memory (RAM) 53, a non-volatile random-access memory (NVRAM) 54, and an application specific integrated circuit (ASIC) 55.

The controller 50 further includes a network interface (I/F) 56 and an input/output (I/O) 57. The controller 50 controls the operations of the overall lamination processing system with these units and components.

The CPU 51 controls the operations of the overall system based on the programs stored in the memory (such as the ROM 52).

The RAM 53 is a storage area of the controller 50, and stores the amount of deflection detected by the deflection sensor 36, via the I/O 57.

The network I/F 56 is used to send and receive information to and from an external device such as an information processing device (for example, a personal computer (PC) 12) via a communication network. The network I/F 56 serves as an external connector connectable to an external device.

The controller 50 of the lamination processing system 200a causes the memory to store setting information of the lamination fixing device 20 and controls the lamination fixing device 20 in accordance with the setting information. Further, the guide 34 can be moved in accordance with setting information. In other words, the controller 50 can control the driving of an eccentric motor 42a that rotates the eccentric cam 42 that contacts the guide 34.

The controller 50 of the lamination processing system 200a can cause the display panel 10 to display the amount of deflection detected by the deflection sensor 36 on the screen. This allows the user to select an appropriate guide 34 and to finely adjust the conveyance speed of the sheet separation device 100.

Further, the controller 50 of the lamination processing system 200a can connect with an external device such as a personal computer (PC) 12 via the network I/F 56 and cause the amount of deflection detected by the deflection sensor 36 to display on, for example, the display of an external device.

With the above-described operations, the user can select an appropriate guide 34 and finely adjust the conveyance speed of the sheet separation device 100.

Figure 12:
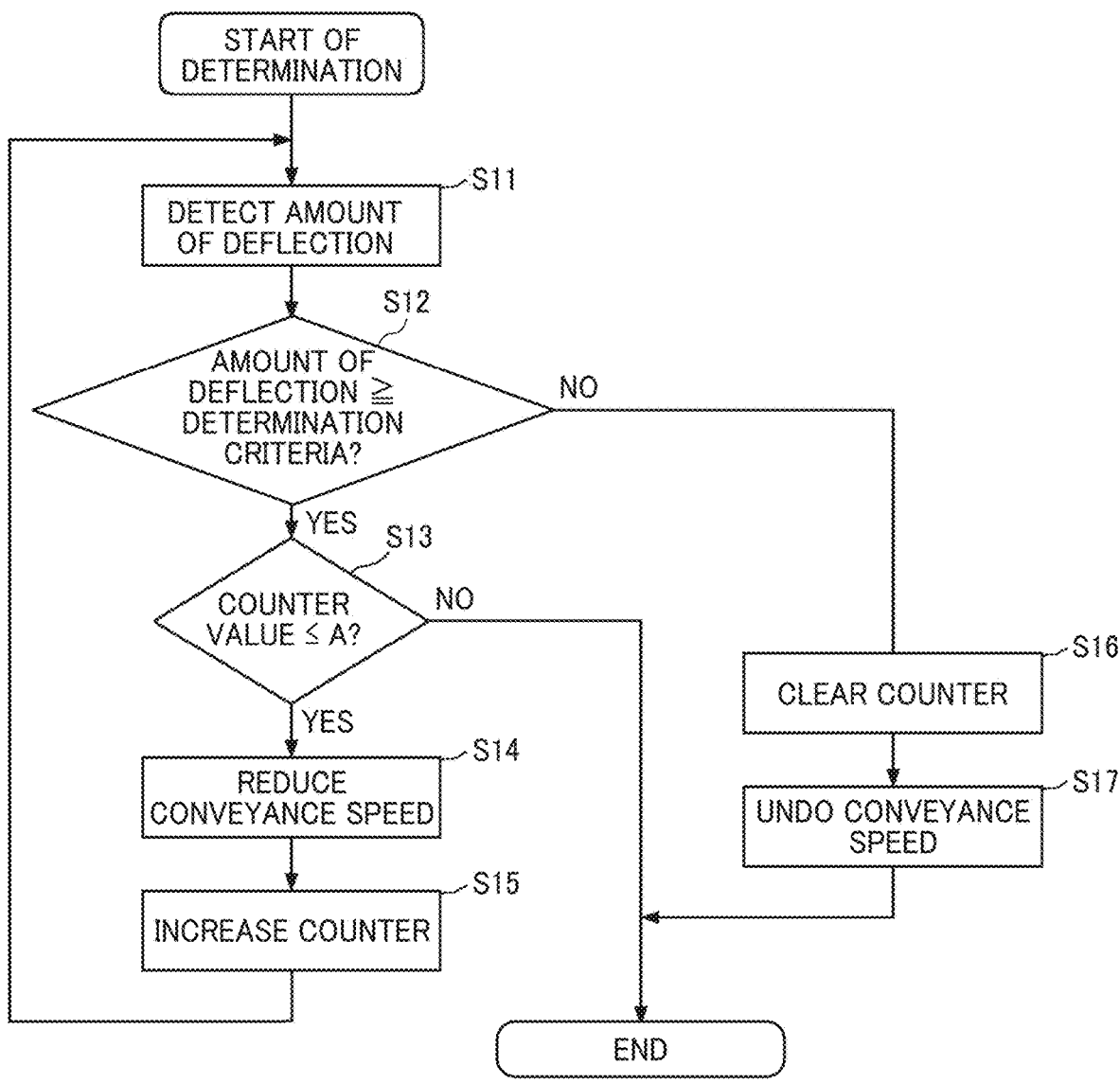
FIG. 12 is a flowchart of a control procedure of a conveyance speed of a sheet in a sheet separation device.

FIG. 12 is a flowchart of a control procedure of the conveyance speed of a sheet in the sheet separation device 100.

In step S11, the lamination processing system 200a detects the amount of deflection detected by the deflection sensor 36.

Then, in step S12, the lamination processing system 200a determines whether the detected amount of deflection is equal to or greater than a determination criteria. When the amount of deflection is equal to or greater than the determination criteria (YES in step S12), the process proceeds to step S13.

In step S13, the controller 50 refers to the current counter value and determines whether the counter value is equal to or smaller than a given number (RA). The counter value is the number of times the conveyance speed is reduced. When the counter value is equal to or smaller than the given number (RA) (YES in step S13), the process proceeds to step S14.

In step S14, the lamination processing system 200a reduces the conveyance speed of the sheet in the sheet separation device 100. Then, in step S15, the current counter value is incremented by 1. Then, the process returns to step S11 again to detect the amount of deflection.

On the other hand, when the amount of deflection is less than the determination criteria (NO in step S12), the process proceeds to step S16 to clear the current counter value (in other words, to change the current counter value to zero). Then, in step S17, the conveyance speed of the sheet separation device 100 is returned to the original set value, and the process ends.

In step S13, when the counter value is greater than the given number (RA) (NO in step S13), the process also ends. The reason of ending the process is not to excessively reduce the conveyance speed of the sheet separation device 100.

As described above, the lamination processing system 200a according to the present embodiment can change the conveyance speed of a sheet in the sheet separation device 100 based on the amount of deflection.

Instead of (or in addition to) reducing the conveyance speed of the sheet separation device 100, the conveyance of a sheet from the sheet separation device 100 may be temporarily stopped.

Figure 13:
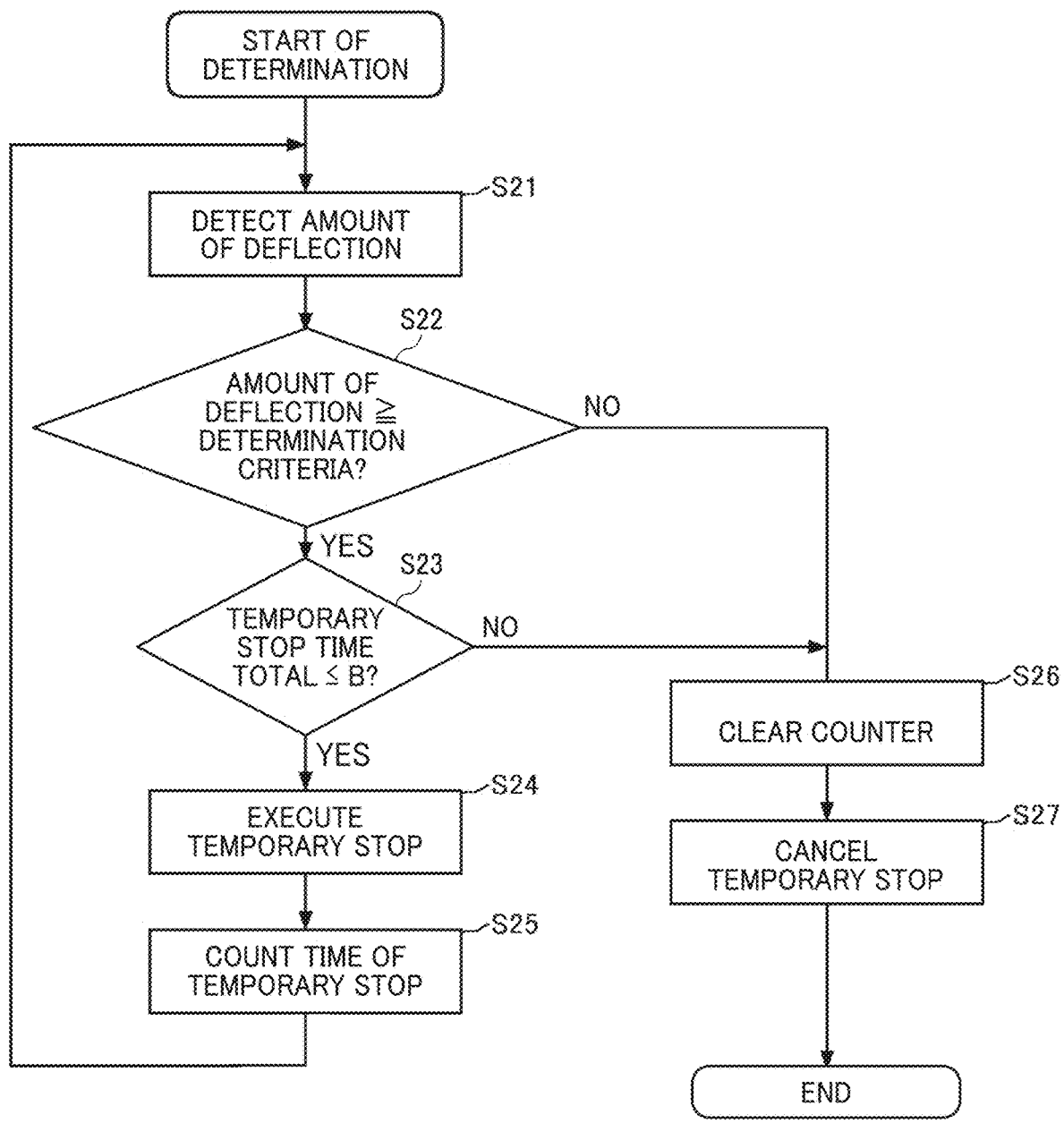
FIG. 13 is a flowchart of procedure of temporarily stopping or cancelling the stop of conveyance of a sheet in the sheet separation device.

FIG. 13 is a flowchart of procedure of temporarily stopping or cancelling the stop of conveyance of a sheet in the sheet separation device.

In step S21, the lamination processing system 200a detects the amount of deflection by the deflection sensor 36.

Then, in step S22, the lamination processing system 200a determines whether the detected amount of deflection is equal to or greater than the determination criteria. When the amount of deflection is equal to or greater than the determination criteria (YES in step S22), the process proceeds to step S23.

In step S23, the controller 50 refers to the current temporary stop cumulative time and determines whether the value of the current temporary stop cumulative time is equal to or smaller than a given time (TB). The temporary stop cumulative time is a time during which the sheet separation device 100 has stopped the conveyance of a sheet. When the value of the current temporary stop cumulative time is smaller than the given time (TB) (YES in step S23), the process proceeds to step S24.

In step S24, the lamination processing system 200a temporarily stops the conveyance of a sheet in the sheet separation device 100. Then, in step S25, the temporarily stopped time is added to the current temporary stop cumulative time. Then, the process returns to step S21 again to detect the amount of deflection of the sheet.

On the other hand, when the amount of deflection is less than the determination criteria (NO in step S22), the process proceeds to step S26 to clear the current temporary stop cumulative time (in other words, to change the current temporary stop cumulative time to zero).

Similarly, in step S23, when the current temporary stop cumulative time is greater than the given time (TB) (NO in step S23), the process proceeds to step S26, and the current temporary stop cumulative time is cleared (in other words, changed to zero).

Subsequently, in step S27, the controller 50 releases the temporary stop of the sheet separation device 100 (or starts the conveyance), and the process ends.

As described above, the lamination processing system 200a according to the present embodiment can temporarily stop the conveyance of a sheet in the sheet separation device 100 based on the amount of deflection of the sheet.

The processes performed in FIGS. 10 and 11 are combined to reduce the conveyance speed or temporarily stop conveyance of the sheet, from the sheet separation device 100 to the lamination fixing device 20.

Some embodiments of the present disclosure have been described in detail above. The above-described embodiments are examples and can be modified within the scope not departing from the gist of the present disclosure. For example, the first embodiment and the second embodiment may be combined.

The above-described embodiments are limited examples, and the present disclosure includes, for example, the following aspects having advantageous effects. In the description of the aspects, reference numerals in parentheses after constituent names are examples of corresponding members, and the members are not limited to the examples.

Aspect 1

In Aspect 1, a lamination processing system includes a sheet separation device, a lamination fixing device, and a conveyor. The sheet separation device is in a first housing, to separate a two-ply sheet in which two sheets are overlapped and bonded together at one ends to insert a sheet medium between the two sheets of the two-ply sheet to form an enclosed two-ply sheet. The lamination fixing device is in a second housing different from the first housing. The lamination fixing device includes an inlet port from which the enclosed two-ply sheet enters, and a heater to apply heat and pressure to the enclosed two-ply sheet to fix the enclosed two-ply sheet. The conveyor conveys the enclosed two-ply sheet from the sheet separation device in the first housing to the lamination fixing device in the second housing in a conveyance direction. The conveyor includes a conveyance passage and a guide. The conveyance passage guides the enclosed two-ply sheet from the sheet separation device toward the inlet port of the lamination fixing device. The guide is downstream from the conveyance passage in the sheet conveyance direction to guide the enclosed two-ply sheet to the inlet port. The guide forms a space accommodatable a deflected part of the enclosed two-ply sheet formed by a difference in a conveyance speed of the enclosed two-ply sheet between the sheet separation device and the lamination fixing device.

Aspect 2

In Aspect 2, the lamination processing system according to Aspect 1 further includes a deflection detector and circuitry. The deflection detector detects a degree of deflection of the deflected part of the enclosed two-ply sheet. The circuitry is configured to cause the guide to move according to the degree of deflection detected by the deflection detector to form the space accommodatable the deflected part of the enclosed two-ply sheet.

Aspect 3

In Aspect 3, in the lamination processing system according to Aspect 2, the circuitry is further to adjust the conveyance speed of the enclosed two-ply sheet from the sheet separation device to the lamination fixing device according to the degree of deflection of the deflected part detected by the deflection detector.

Aspect 4

In Aspect 4, in the lamination processing system according to Aspect 2, the circuitry is further to decrease or temporarily stop the conveyance speed of the enclosed two-ply sheet from the sheet separation device to the lamination fixing device.

Aspect 5

In Aspect 5, in the lamination processing system according to Aspect 2, the circuitry is further to store setting information of the lamination fixing device, control the lamination fixing device in accordance with the setting information, and move the guide in accordance with the setting information.

Aspect 6

In Aspect 6, the lamination processing system according to Aspect 2 further includes a display. The circuitry is further to cause the display to display the degree of deflection of the deflected part detected by the deflection detector.

Aspect 7

In Aspect 7, the lamination processing system according to Aspect 2 further includes an external connector connectable to an external device. The circuitry is further to cause the external device to display the degree of deflection detected by the deflection detector via the external connector.

Aspect 8

In Aspect 8, in the lamination processing system according to Aspect 1, the guide is detachably attachable to the conveyor.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A lamination processing system comprising:
   a sheet separation device in a first housing, the sheet separation device configured to separate a two-ply sheet in which two sheets are overlapped and bonded together at one ends to insert a sheet medium between the two sheets of the two-ply sheet to form an enclosed two-ply sheet;
   a lamination fixing device in a second housing different from the first housing, the lamination fixing device including:
   an inlet port from which the enclosed two-ply sheet enters; and
   a heater configured to apply heat and pressure to the enclosed two-ply sheet to fix the enclosed two-ply sheet; and
   a conveyor configured to convey the enclosed two-ply sheet from the sheet separation device in the first housing to the lamination fixing device in the second housing in a conveyance direction,
   the conveyor including:
   a conveyance passage configured to guide the enclosed two-ply sheet from the sheet separation device toward the inlet port of the lamination fixing device; and
   a guide downstream from the conveyance passage in a sheet conveyance direction configured to guide the enclosed two-ply sheet to the inlet port, and
   the guide configured to form a space accommodatable for a deflected part of the enclosed two-ply sheet formed by a difference in a conveyance speed of the enclosed two-ply sheet between the sheet separation device and the lamination fixing device.

2. The lamination processing system according to claim 1, further comprising:
   a deflection detector configured to detect a degree of deflection of the deflected part of the enclosed two-ply sheet; and
   circuitry configured to cause the guide to move according to the degree of deflection detected by the deflection detector to form the space accommodatable for the deflected part of the enclosed two-ply sheet.

3. The lamination processing system according to claim 2, Wherein the circuitry is further configured to adjust the conveyance speed of the enclosed two-ply sheet from the sheet separation device to the lamination fixing device according to the degree of deflection of the deflected part detected by the deflection detector.

4. The lamination processing system according to claim 2, wherein the circuitry is further configured to decrease or temporarily stop the conveyance speed of the enclosed two-ply sheet from the sheet separation device to the lamination fixing device.

5. The lamination processing system according to claim 2, wherein the circuitry is further configured to:
   store setting information of the lamination fixing device;
   control the lamination fixing device in accordance with the setting information; and
   move the guide in accordance with the setting information.

6. The lamination processing system according to claim 2, further comprising a display,
   wherein the circuitry is further configured to cause the display to display the degree of deflection of the deflected part detected by the deflection detector.

7. The lamination processing system according to claim 2, further comprising
   an external connector connectable to an external device,
   wherein the circuitry is further configured to cause the external device to display the degree of deflection detected by the deflection detector via the external connector.

8. The lamination processing system according to claim 1, wherein the guide is detachably attachable to the conveyor.

9. The lamination processing system according to claim 1, wherein the guide is configured to change a size of the space accommodatable the deflected part of the enclosed two-ply sheet based on the two-ply sheet in the conveyance passage.

10. The lamination processing system according to claim 1, wherein the guide is located above an opening of the conveyance passage.

11. The lamination processing system according to claim 1, wherein the guide defines an inner surface facing the conveyance passage, the inner surface having a concave shape away from the conveyance passage.

12. A lamination processing system comprising:
a sheet separation device in a first housing, the sheet separation device configured to separate a two-ply sheet in which two sheets are overlapped and bonded together at one ends to insert a sheet medium between the two sheets of the two-ply sheet to form an enclosed two-ply sheet;
a lamination fixing device in a second housing different from the first housing, the lamination fixing device including:
an inlet port from which the enclosed two-ply sheet enters; and
a heater configured to apply heat and pressure to the enclosed two-ply sheet to fix the enclosed two-ply sheet; and
a conveyor configured to convey the enclosed two-ply sheet from the sheet separation device in the first housing to the lamination fixing device in the second housing in a conveyance direction,
the conveyor including:
a conveyance passage configured to guide the enclosed two-ply sheet from the sheet separation device toward the inlet port of the lamination fixing device; and
a guide configured to
guide the enclosed two-ply sheet to the inlet port,
form a space accommodatable for a deflected part of the enclosed two-ply sheet formed by a difference in a conveyance speed of the enclosed two-ply sheet between the sheet separation device and the lamination fixing device, and
change a size of the space accommodatable the deflected part of the enclosed two-ply sheet based on the two-ply sheet in the conveyance passage.

13. The lamination processing system according to claim 12, further comprising:
a deflection detector configured to detect a degree of deflection of the deflected part of the enclosed two-ply sheet; and
circuitry configured to cause the guide to move according to the degree of deflection detected by the deflection detector to form the space accommodatable for the deflected part of the enclosed two-ply sheet.

14. The lamination processing system according to claim 12, wherein the guide is located above an opening of the conveyance passage.

15. The lamination processing system according to claim 12, wherein the guide defines an inner surface facing the conveyance passage, the inner surface having a concave shape away from the conveyance passage.

* * * * *